United States Patent [19]

Landsberger et al.

[11] Patent Number: 4,666,362

[45] Date of Patent: May 19, 1987

[54] PARALLEL LINK MANIPULATORS

[75] Inventors: Samuel E. Landsberger, Cambridge; Thomas B. Sheridan, West Newton, both of Mass.

[73] Assignee: Massachusetts Institute of Technology, Cambridge, Mass.

[21] Appl. No.: 731,711

[22] Filed: May 7, 1985

[51] Int. Cl.[4] .............................................. B66C 1/00
[52] U.S. Cl. ...................................... 414/735; 901/21; 212/239
[58] Field of Search .................. 414/7, 735, 680, 687, 414/688; 901/21; 248/178, 279; 212/193, 239, 262

[56] References Cited

U.S. PATENT DOCUMENTS

| 3,261,223 | 7/1966 | Vertut | 74/380 |
|---|---|---|---|
| 3,266,059 | 8/1966 | Stelle . | |
| 3,286,851 | 11/1966 | Sperg | 212/193 |
| 3,335,620 | 8/1967 | Vertut . | |
| 3,365,074 | 1/1968 | Bradshaw | 212/193 |
| 3,631,737 | 1/1972 | Wells | 74/469 |
| 3,776,513 | 12/1973 | Mosley | 254/361 X |
| 3,893,572 | 7/1975 | Axelsson et al. | 254/361 X |

FOREIGN PATENT DOCUMENTS 0017016 3/1980 European Pat. Off. .

OTHER PUBLICATIONS

Minsky, Marvin, *Artificial Intelligence—Memo No. 267*, Massachusetts Institute of Technology, A.I. Laboratory, "Manipulator Design Vignettes" (Oct. 1972), pp. 1-23.

*Primary Examiner*—L. J. Paperner
*Assistant Examiner*—D. Glenn Dayoan
*Attorney, Agent, or Firm*—Hamilton, Brook, Smith & Reynolds

[57] ABSTRACT

The invention is embodied in a manipulator for supporting and transmitting movement to a tool or the like comprising a base 10, a movable tripod tip 16 or plate 60 spaced from the base to which a tool may be attached, an elongated central spine 12, one end of which is attached to the tripod tip and the other pivotally mounted on the base, variable tension applying means comprising at least three cables 18 extending from the tripod tip to the base in a tripod configuration, and means 22, 24 at the base to continuously vary the length of each cable to vary its length.

19 Claims, 6 Drawing Figures

PARALLEL LINK MANIPULATORS

The Government has rights in this invention pursuant to Grant Number NA81-AA-D-00069 awarded by the National Oceanic and Atmospheric Administration.

DESCRIPTION

1. Field of the Invention

This invention relates to parallel link manipulators for supporting and transmitting movement to a tool or the like and has versatile application on land and in undersea applications, as well as in space.

2. Background of the Invention

Mechanical manipulators are becoming more and more common in today's technology. They are found in increasing numbers in industry in the form of robot arms which perform tasks such as welding on automobile assembly lines. This type of manipulator generally performs the same function over and over again and is usually custom designed to perform its one function but few, if any, others. At the other end of the spectrum more sophisticated manipulators have been made but in fewer numbers for use in zero gravity environment, such as earth orbiting space flights. While these manipulators are capable of performing multiple tasks, their design is generally dictated by conditions which exist in zero gravity where strength is of secondary importance. In between exists the great range of manipulators designed to perform both single and multiple tasks with their design being dictated generally by a predetermined knowledge of the tasks to be performed and the environment in which they will perform.

The present invention is directed to the design of a universal manipulator having the capabilities of performance both on land and in undersea applications as well as in space. A need exists to perform work such as cleaning, inspection, simple repair and assembly as well as undersea welding. Extreme depths, murky waters and turbulence frequently preclude such tasks being performed by divers. These problems however, are not insurmountable for unmanned submarines equipped with remotely controlled tools. Manipulators made in accordance with this invention have particular utility in such operations.

Most manipulators today are of the serial-link or series type. The serial-link mechanism is multi stage being made of successive links usually hinged at rotary joints which are actuated in a coordinated fashion to effect the location of the final stage or end effector. They are analogous to the human arm which has a series of links hinging at the shoulder, elbow and wrist. These types of manipulators generally have poor strength-to-weight ratios and suffer from joint striction.

One example of a serial-link manipulator is shown in U.S. Pat. No. 3,631,737 to Wells wherein seven successive serially arranged links are employed to produce motion at the free end of the arm.

In contrast to the serial-link type is the parallel-link configuration in which the links of the assemblage are not staged one after another out to the end of the manipulator but function in tandem to determine the position of the end effector. A camera tripod or a guy wired radio antenna are examples, however they are stationary. If one of the legs of the tripod is pulled or moved inwardly or outwardly it changes the location of the end point and also results in a responsive reaction in the other legs not unlike tendons and muscles acting in pairs or groups to twist or rotate a bone.

The human neck is analagous to a 5 degree of freedom manipulator with the head as the end effector. If the neck were capable of extending itself as well as twisting and turning, the head would have 6 degrees of freedom.

Parallel-link manipulators have the following advantages over serial-link manipulators:

1. Very high strength/stiffness-to-weight ratios can be achieved because actuating links bear no moment loads, but are simple tension-compression members.
2. Because the actuators act in parallel, rather than series, to position an end effector attached to the actuator, the force and moment capacity of the manipulator is much higher than that of individual servomotors used to operate the manipulator. A serial link arm is no stronger than its weakest link or joint actuator.
3. Manipulator inertia is minimal. Bulky links and massive motors are not being waved about in space—only the end effector. This results in economy of power and superior dynamic performance.
4. High accuracy results from the geometry: actuator errors are not multiplied by long linkage arms to determine endpoint tolerances: rather, the end effector offset is normally of the order of actuator offset, due to their direct connection.
5. Simplicity results from the direct connection between the actuator and its effector. No complex drive trains are necessary. This pays dividends in cost, reliability, and performance—friction and backlash are minimized.

In an early consideration of parallel versus serial link manipulators, Marvin Minsky in work conducted at the Artificial Intelligence Laboratory at the Massachusetts Institute of Technology in a research program supported in part by the Advanced Research Projects Agency of the Department of Defense, and monitored by the Office of Naval Research included contact number N00G14-70-A-0362-0003 suggested:

A system having a single incompressible rod mounting at one end a rectangular block with five cables pulling the block against the incompressible rod. One cable is attached to each of three separate corners of the block and two cables to the fourth corner.

DISCLOSURE OF THE INVENTION

The invention resides in a parallel-link manipulator for supporting and transmitting movement to a tool or the like. One embodiment includes a base and an end effector which may take the form of a tripod tip spaced from the base. To this end effector a tool may be attached. An elongated passive, compressible, central spine mounts the end effector or tripod tip on one end and the other end is pivotally mounted on the base. Tension applying means comprising at least three cables are fixed to the tripod tip and extend to the base in a tripod configuration. The free end of each cable is accumulated at the base to permit the length of each cable to be varied. Motor means at the base continuously apply tension to each cable to vary its length. All cables are always in tension and the central spine is always under a compressive force. As the length of a cable is shortened, it tends to pull the tripod tip in the direction of applied force against the tensile resistance of one or two of the other cables while at all times the central spine is under the compressive forces of the tension cables. A manipulator made in accordance with this embodiment and using a rigid spine is capable of 2 degrees of freedom. The use of an extensible spine results in an additional degree of freedom being imparted to the tripod tip which is movement along the extended axis of the telescoping member. This movement adds a third degree of freedom to the tripod tip or end effector.

Means for accumulating cable at the base may be spools upon which the cable is wound driven by reversible electric or hydraulic motors, or hydraulic cylinders.

In another embodiment of the invention a movable plate to which a tool may be attached is pivotally mounted on the extendible or telescoping spine. Six cables are employed. They are attached to the plate and, as in the 3-cable configuration, are accumulated at the base. The ultimate result, as the cables are continually wound on and paid off from their respective spools under tension, is a full 6 degree of freedom for the upper plate.

These and other features of the invention including various novel details of construction and combination of parts, will now be more particularly described with reference to the accompanying drawings and pointed out in the claims. It will be understood that the particular manipulators embodying the invention are shown by way of illustration only and not as a limitation of the invention. The principles and features of this invention may be employed in varied and numerous embodiments without departing from the scope of the invention.

BEST MODE OF CARRYING OUT THE INVENTION

Figure 1:
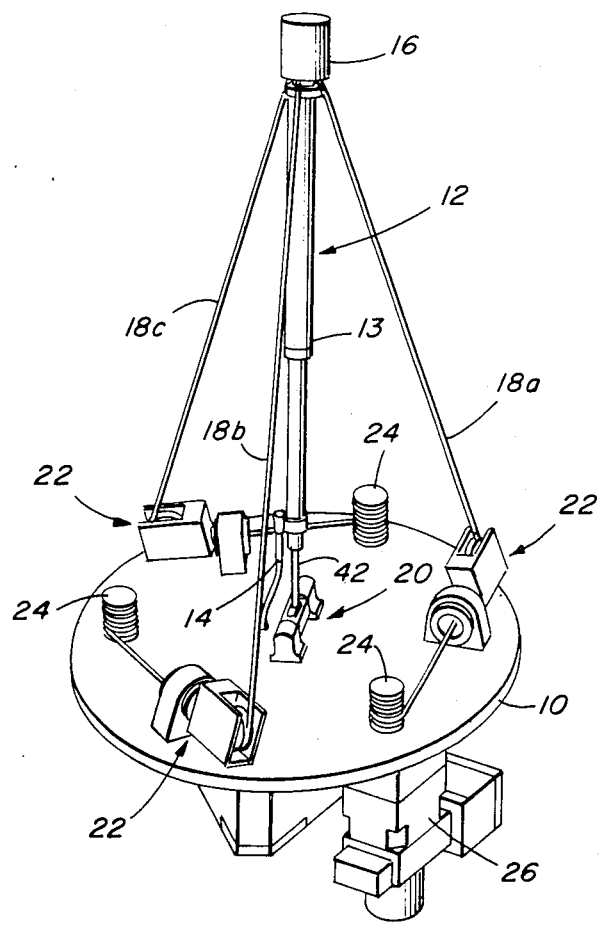
FIGS. 1 and 2 are perspective views disclosing a three-cable manipulator having a compression member in the form of a telescoping spine and shown in different positions or orientations.
Figure 2:
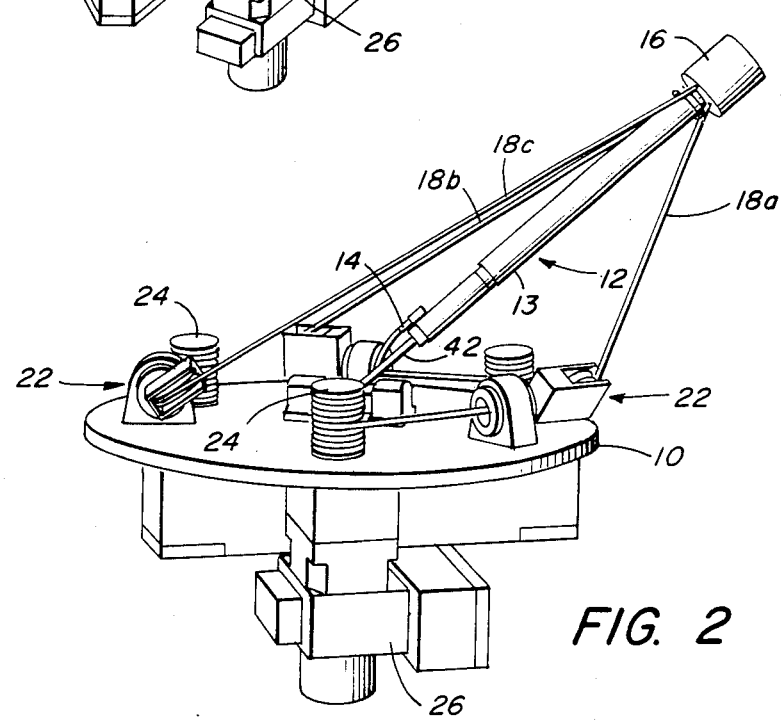

One embodiment of a parallel link manipulator for supporting and transmitting movement to a tool or the like is shown in FIGS. 1 and 2. It includes a base 10 which is a flat circular disk, an elongated compression member 12 or passive compressible central spine in the form of a telescoping hydraulic cylinder 13 comprising a reversible hydraulic cylinder extending upwardly from the base and which, in its simplest form, may be a rod or other rigid member. It may also be a telescopic rotary ball screw. Compressed hydraulic fluid is admitted to the cylinder through an inlet pipe 14 from a source of controlled pressurized hydraulic fluid, not shown. At the top of the spine is a tripod tip 16 in the form of a cylinder threadedly attached to the compression member telescoping spine 12.

Three cables 18a, 18b and 18c, extend from the tripod tip 16 to the base 10. One end of each cable is fixed to the tripod tip and the opposite end is accumulated at the base to permit the length of each cable to be varied.

The lower end of the compression member or telescoping spine 12 is pivoted on the base in a gimbal 20 which will be described in more detail hereinafter. The cables 18 are arranged in a tripod configuration and each passes around a swivel pulley 22 and is wound on a spool 24 which is driven by reversible hydraulic motor 26.

Figure 3:
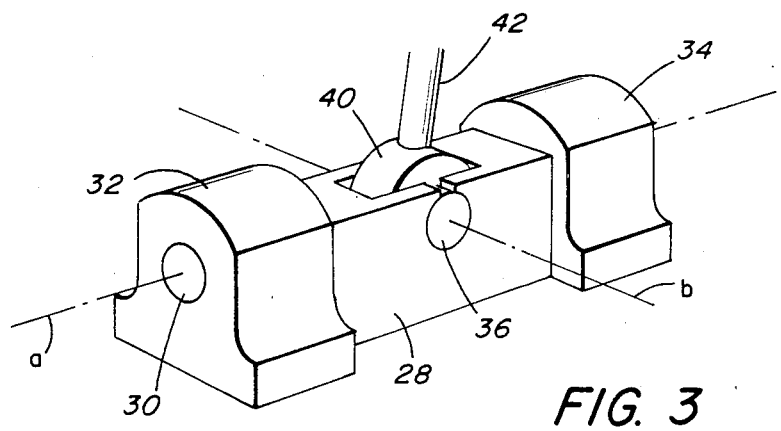
FIG. 3 is a perspective view of a universal gimbal employed to mount the compression member to the base of the manipulator.

The gimbal 20 which allows the spine or compression member to pivot on the base 10 will now be described with reference to FIG. 3. The gimbal comprises a one-piece aluminum fork 28 supported by stainless shafts 30 (only one of which is seen in FIG. 3). The shafts rotate in two support blocks 32 and 34 about axis a. A shaft 36 is received in the fork 28 and mounts disk 40 intermediate its ends. The shaft and hence the disk 40 rotate about an axis b which is normal to and intersects the access a. A rod 42 extends from the disk 40 and is threaded into the lower end of the telescoping hydraulic cylinder 12. The rod 42, and hence the telescoping spine, is rotatable through a solid angle of 120 degrees.

Figure 4:
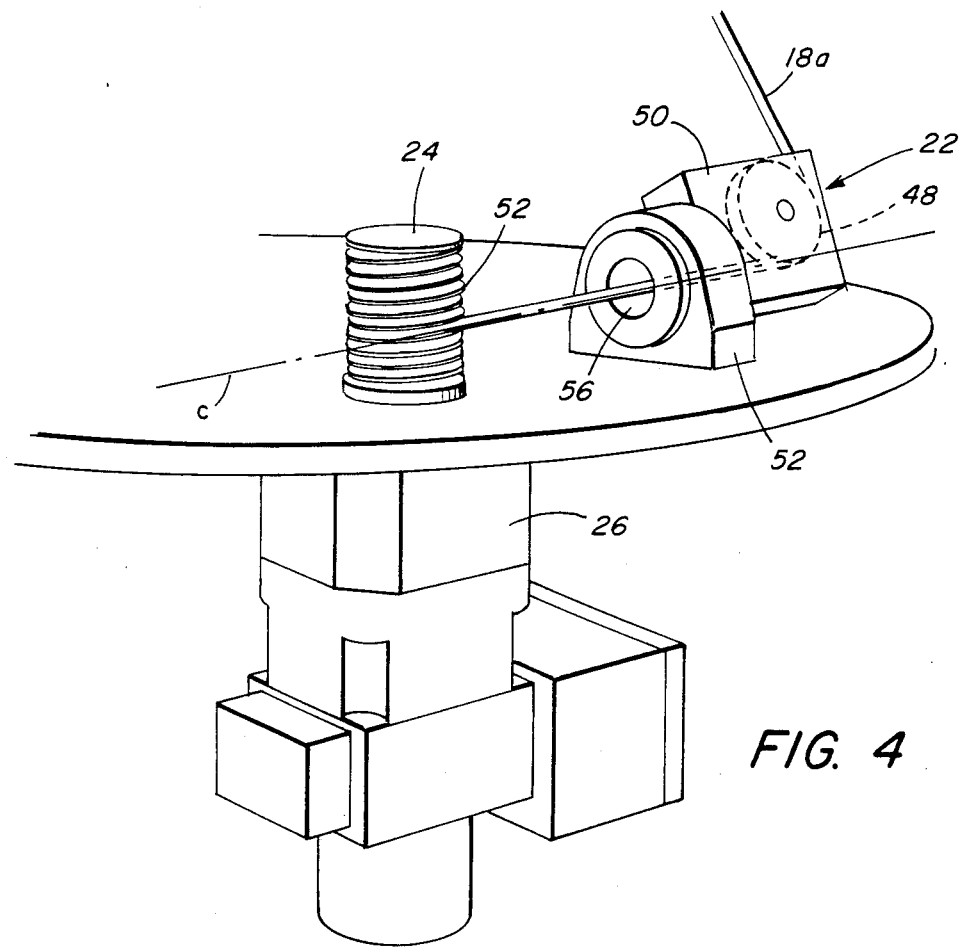
FIG. 4 is a perspective view of mechanism for varying the length of each cable comprising a motor, a winding spool and pulley mechanism for guiding the cable.

The pulleys 22 and the take up spools 24 will now be described with reference to FIG. 4. To enable each cable spool 24 to wrap correctly, an intermediary idler pulley 22 is pivotally mounted adjacent to each spool in order to swivel. The swivelling idler pulley comprises a idler pulley wheel 48 mounted for rotation within a housing 50 and having openings (not shown) for the cable 18 to pass through. The housing 50 is pivotally mounted on a block 52 secured to the base 10. It rotates about an axis c which is tangential to both the idler pulley 48 and the cable spool 24 so that the center line separation is constant regardless of pulley orientation.

The spool 24 is driven in clockwise and counter clockwise directions by the reversible hydraulic motor 26 which is mounted beneath the base 10 and has an output shaft (not shown) secured to the spool 24. Each spool is threaded as shown at 52 so that as the cable 18 is wound on or paid off it will rise and fall following the flutes of the spool. It passes through an opening 56 in the block 52, the opening 56 being sufficiently large to accommodate the cable without binding whether it is being wound at the top or bottom or middle of spool 24. As the tension on the cable is increased, is supplied or reduced, the tripod tip 16 will be moved, as will be described in more detail hereinafter. As the path of travel of the cables change each housing 50, depending upon the orientation, its cable will swivel about the axis c while the cable passes around the pulley 48 in a direction either toward or away from the spool 24.

Figure 5:
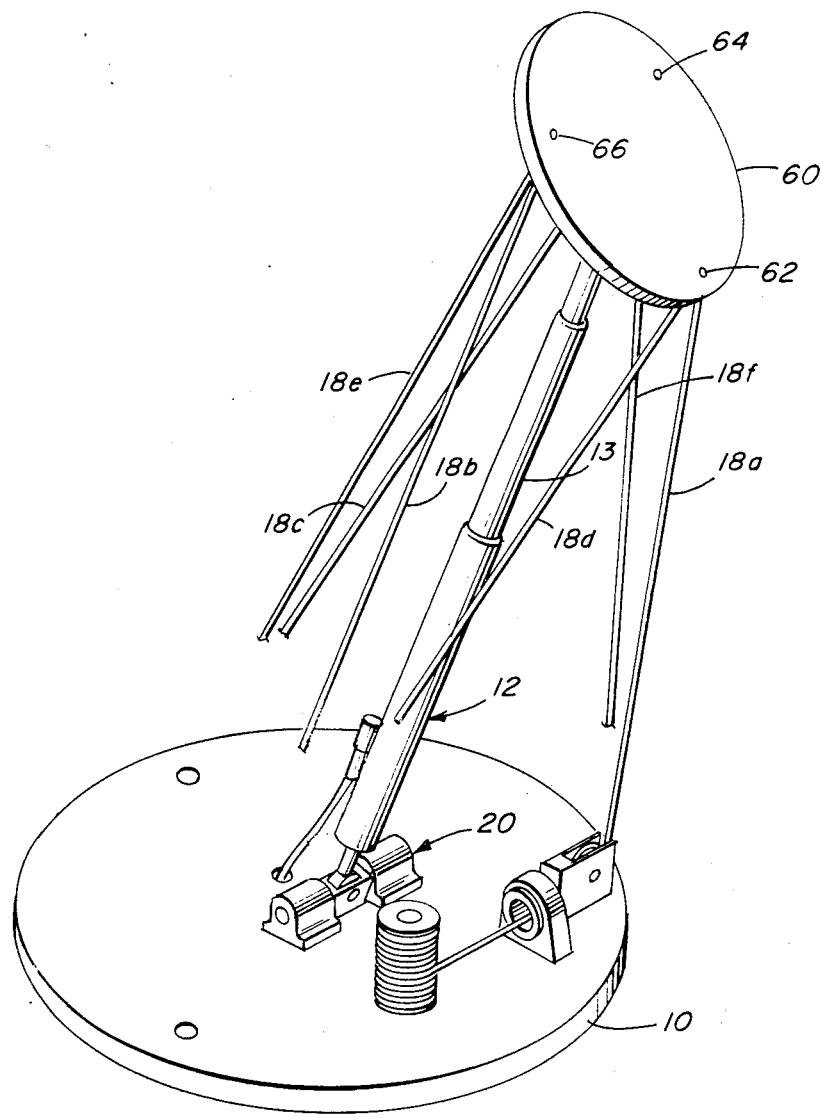
FIG. 5 is a perspective schematic view of another embodiment of the invention embodying six tension cables.
Figure 6:
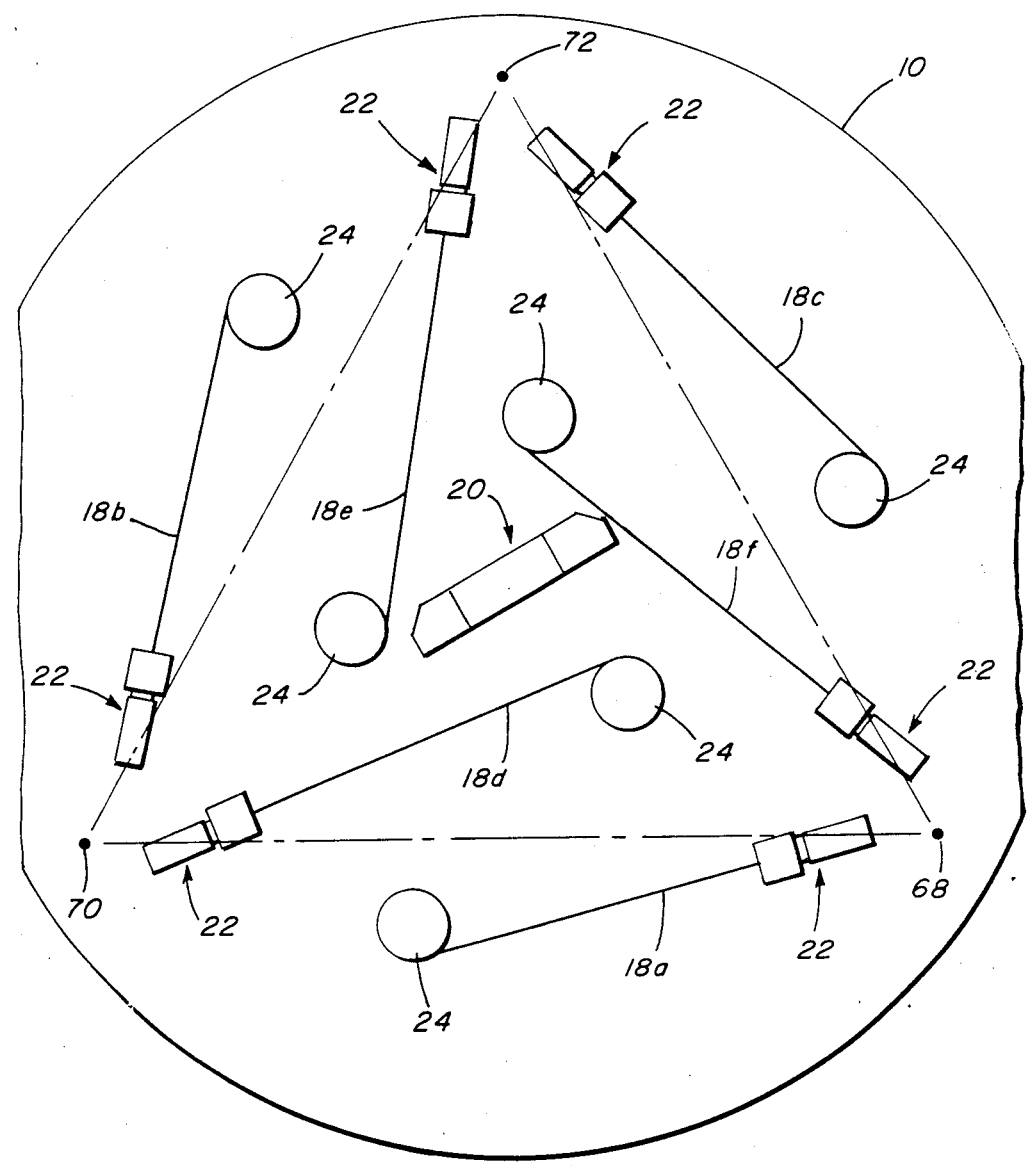
FIG. 6 is a schematic plan view of the FIG. 5 embodiment showing the cables and their spooling mechanisms arranged relative to the manipulator base.

Another embodiment of the invention is shown in FIGS. 5 and 6 whereby the motion produced will be a full 6 degrees of freedom. The FIG. 5 embodiment (as does the FIG. 1 embodiment) has a base 10, a compression member 12 in form of a telescoping spine 13 comprising a reversible hydraulic piston. The tripod tip is replaced by an upper plate 60 having a flat circular configuration. The upper plate, as distinguished from the tripod 16 of the FIG. 1 embodiment, is not rigidly attached to the compression member 12 but pivotly mounted to it by a gimbal identical with the gimbal 20 securing the compression member to the base of each of the embodiments. In addition to the three cables 18a, 18b, and 18c of the FIG. 1 embodiment are three more cables 18d, 18e and 18f. All but one cable is shown foreshortened for clarity. They are arranged in a tripod configuration both with respect to the base and with respect to the upper plate. The upper ends of the cables are attached to the plate 60 at points 62, 64 and 66, two cables each are being secured at each point. The cables extend downwardly toward the base 10 in tripod fashion with one cable from each point 62,64,66 and a cable from the adjacent point extending downwardly toward points on the base designated 68, 70, 72. This configuration is shown schematically in FIG. 6 and it will be appreciated that near but not necessarily precisely at points 68,70,72 will be two swivel pulleys 22 each for a separate cable, with each cable being wound on its own spool 24. While this arrangement is not absolutely essential to the invention, it provides for better symmetry, easier arrangement of the pulleys 22 and spools 24 on the base 10 and easier balancing of the machine controls. As in the FIG. 1 configuration each spool is driven by a reversible hydraulic motor not seen in the figure.

The operation of the manipulator will now be described. With reference to the FIG. 1 embodiment, a tool may be is attached to the tripod tip 16. The tool would probably be less sophisticated than a tool employed with the FIG. 5 embodiment, because the FIG. 5 embodiment is capable of producing a far greater complexity of motion i.e. 6 degrees of freedom vs. 2 or 3 for the FIG. 1 configuration. The passive, compressible central spine is pressurized to a pre-selected pressure and maintained at that pressure through appropriate internal venting, thus rendering the spine a compressible constant force spring.

The three hydraulic motors 26 are connected to a source of pressurized hydraulic fluid through appropriate valving (not shown). The valving to the hydraulic motors may be controlled by a mechanism as simple as a joy stick or as sophisticated as a pre-programmed computer. The motors are first operated to wind cable on to each of the spools 24 whereby each cable is placed in tension and the compression member 12 is under compressive forces from the cables. Thereafter to impart movement to a tool mounted on the tripod tip 16, the lengths of the cables are varied in a controlled manner by the accumulating means at the base. For example commanding the hydraulic motor to rotate in the "wind" direction shortens the length of the cable as it is wound upon the spool 24 and causes the compression 12 member to pivot in the gimbal 20 and move from the FIG. 1 to FIG. 2 position.

Simultaneous contraction of the cables 18a and 18b would cause the compression member and hence the tool to not only move in the direction from FIG. 1 to FIG. 2, but in a direction which in essence would be out of the plane of the drawing or toward the viewer.

The FIG. 1 embodiment, if it employed a non-telescoping compression member 12, would be capable of producing movement at any given point on the tripod tip 16 or a tool carried by it in the form of a truncated sphere having no theoretical thickness. The truncated sphere approaches but cannot become a hemisphere because of the physical limitation of interference between the compression member 12 and any of the spools 24, and/or the swivel pulleys 22. The base of the truncated sphere would be a circle defined by the length of the compression member plus the tool within a solid angle of 120 degrees which is the limit of the gimbal 20.

When in the FIG. 1 embodiment, i.e. an embodiment having three cables, the compression member is a telescoping spine or constant force spring the path of movement of the tripod tip and/or the tool, will be a truncated shell having a non-zero wall thickness, the radius of the outside of the shell being the extended length of the telescoping spine plus the length of the tool and the inside of the shell being the fully collapsed length of the spine plus the tool. Thus it will be seen that a third degree of freedom will be imparted by the utilization of a telescoping spine.

Whether the telescoping spine 12 is a hydraulically operated extendible cylinder as shown in the figures, or one of its mechanical equivalents such as a telescopic rotary ball screw, the manipulator is capable of describing any trajectory lying within the bounds of the workspace, e.g. straight lines, circular areas, etc. This is accomplished by causing the hydraulic motion to spool out each a cable to allow the tip to extend autonomously. Conversely, a linear pulling motion can be imparted to the tool when the combined components of forces of the cables exceeds the extension force exerted by the compression member.

The same principle applies when the spine 13 is inclined at other than a right angle relative to the base anywhere within the solid angle 120 degrees.

Confining these motions produces the truncated shell defined above.

The speed and force capacity of operation of the manipulator is controlled by varying the pressure in the telescoping spine 12 by appropriate pressure varying means at the source of hydraulic fluid. Basically the higher the pressure in the telescoping spine the more powerful the manipulator. Low internal spine pressure results in the manipulator to operate in a delicate manner as for example in assembling a watch. Converse high pressure in the spine results in high force capacity as for example that needed to lift an automobile block.

The same principles apply to the FIG. 5 embodiment. However, in addition the upper plate 60 and any tool that it carries is also capable of pivoting with regard to the upper end of the spine 13, and is also rotatable relative to the tip of the spine because it is secured there by same universal gimbal 20 as secures its lower end to the base 10. By the employment of six cables, the FIG. 5 embodiment is capable of 6 degrees of freedom, i.e. it has all of the 3 degrees of freedom of the FIG. 1 embodiment, plus those associated with pivotability and rotation.

As an example, a twist drill may be positioned on the upper plate 60 to drill a hole in an object as a result of rotational movement only being imparted to the upper plate through appropriate cable manipulation. As another example, a cutting torch may be carried by the upper plate 60 and through a combination of motions, including, inter alia, rotation of the plate, pivoting of the plate, and the movement of the plate through an arcuate path while both pivoting and rotating would permit the torch to perform a cutting operation of extremely complex dimensions.

As will be readily understood from the foregoing, regardless of which embodiment the invention resides in, while in operation the cables are always in tension, and the compression member is always in compression.

We claim:

1. A manipulator for supporting and transmitting six degrees of freedom to a tool or the like comprising:
   a base,
   a movable tripod tip spaced from the base and to which a tool or the like may be attached, a passive, compressible, central spine, one end of which is attached to the tripod tip and the other pivotally mounted on the base, means to provide a preset, compressive force in the spine, variable tension applying means comprising six cables extending from the tripod tip to the base in a tripod configuration for constraining the six degrees of freedom, one end of each cable being fixed to the tripod tip and the opposite end being accumulated at the base to permit the length of each cable to be varied, and means at the base to control the length of each cable while applying a compressive force to the central spine and and a tensile force to the other cables, whereby the tripod tip may be moved through six degrees of freedom by varying the length of the cables.

2. A manipulator for supporting and transmitting six degrees of freedom to a tool or the like comprising:

a base, a tripod tip spaced from the base and to which a tool or the like may be attached, a passive, compressible, central, telescoping spine, the opposite ends of which are pivotally attached to the base and the tripod tip respectively, variable tension applying means comprising six cables extending from the tripod tip to the base in a tripod configuration for constraining the six degrees of freedom, one end of each cable being fixed to the tripod tip and the opposite end being accumulated at the base to permit the length of each cable to be varied, means at the base to control the length of each cable while applying a compressive force to the central spine and a tensile force to the other cables, and means to continuously apply a constant pressure within the spind to telescope it outwardly in opposition to the tension in the cables, whereby the tripod tip may be moved within six degrees of freedom by varying the length of the cables, 3. A manipulator for supporting and transmitting six degrees of freedom to a tool or the like comprising:

a base, a movable plate spaced from the base and to which a tool or the like may be attached, an elongated, passive, compressible, central telescoping spine, the opposite ends of which are pivotally attached to the base and the movable plate respectively, variable tension applying means comprising six cables extending from the base to the movable plate in a tripod configuration, one end of each cable being fixed to the movable plate and the opposite end being accumulated at the base to permit the length of each cable to be varied, means at the base to control the length of each cable and apply a compressive force to the telescoping spine and a tensile force to the other cables, and means to continuously apply a constant pressure within the spine to telescoping it outwardly in opposition to the tension in the cables, whereby the plate may be moved within six degrees of freedom by varying the length of the cables.

4. A manipulator according to claim 1 wherein the means for varying the length of the cables are hydraulic motors.

5. A manipulator according to claim 2 wherein the means for varying the length of the cables are hydraulic motors.

6. A manipulator according to claim 3 wherein the means for varying the length of the cables are hydraulic motors.

7. A manipulator according to claim 2 wherein the telescoping spine is a hydraulic cylinder.

8. A manipulator according to claim 3 wherein the telescoping spine is a hydraulic cylinder.

9. A manipulator according to claim 2 wherein the telescoping spine is a hydraulic cylinder and the means for varying the length of the cables are hydraulic motors.

10. A manipulator according to claim 3 wherein the telescoping spine is a hydraulic cylinder and the means for varying the length of the cables are hydraulic motors.

11. A manipulator according to claim 1 wherein the opposite end of each cable is accumulated on a spool driven by a hydraulic motor.

12. A manipulator according to claim 2 wherein the opposite end of each cable is accumulated on a spool driven by a hydraulic motor.

13. A manipulator according to claim 3 wherein the opposite end of each cable is accumulated on a spool driven by a hydraulic motor.

14. A manipulator according to claim 1 wherein each cable passes around an idler pulley and is accumulated on a spool, the pulley being mounted for rotation about an axis tangential to the spool and normal to its axis of rotation.

15. A manipulator according to claim 2 wherein each cable passes around an idler pulley and is accumulated on a spool, the pulley being mounted for rotation about an axis tangential to the spool and normal to its axis of rotation.

16. A manipulator according to claim 3 wherein each cable passes around an idler pulley and is accumulated on a spool, the pulley being mounted for rotation about an axis tangential to the spool and normal to its axis of rotation.

17. A manipulator according to claim 1 wherein the end of the central spine which is pivotally attached to the base is secured in a universal pivot with axes intersecting at 90° and rotatable through a solid arc of 120°.

18. A manipulator according to claim 2 wherein the end of the telescoping spine which is pivotally attached to the base is secured in a universal pivot with axes intersecting at 90° and rotatable through a solid arc of 120°.

19. A manipulator according to claim 3 wherein the ends of the telescoping spine which are pivotally attached to the base and the movable plate are each secured in a universal pivot with axes intersecting at 90° and rotatable through a solid arc of 120°.

* * * * *